June 24, 1947. H. A. GOLLMAR 2,422,781

GAS PURIFICATION APPARATUS AND METHOD

Filed Aug. 29, 1944

INVENTOR.
HERBERT A. GOLLMAR.
BY
his ATTORNEY.

Patented June 24, 1947

2,422,781

UNITED STATES PATENT OFFICE 2,422,781

GAS PURIFICATION APPARATUS AND METHOD

Herbert A. Gollmar, Mount Lebanon, Pa., assignor to Koppers Company, Inc., Pittsburgh, Pa., a corporation of Delaware Application August 29, 1944, Serial No. 551,751

7 Claims. (Cl. 23—225)

The present invention relates to an improved process and apparatus for gas and liquid purification. More particularly the invention relates to a process in which a solid is present that must be separated from a gas purification liquid, and at the same time the purification liquid is regenerated for reuse.

The usual apparatus for regenerating, for example, fouled thioarsenate solutions flowing from an absorption step for the removal of hydrogen sulphide, and the like, from fluids, especially from gases, comprises a regenerating tower or so-called pressure thionizer. Sulphur is liberated from the solution as a result of the regeneration, being separated from the regenerated solution by allowing the sulphur as a foam blanket with air bubbles to overflow from the regeneration tower to a trough adjacent thereto. The regenerated solution is drawn off at some point below the sulphur foam.

In another type of regenerating tower wherein dividing walls are used to cause the fouled solution to flow through a succession of upwardly and downwardly flowing flow streams, the sulphur foam is overflowed from each upwardly flowing stream to a common circular trough circumferentially disposed around the tower.

The blanket of sulphur foam on each up-flowing solution stream should be kept relatively dense or high in sulphur content, otherwise too much of the solution is removed with the sulphur and the volume of solution that must be handled by a filter means for separating sulphur becomes objectionably high. However, sulphur in a foam blanket separates therefrom and sinks into the regenerated solution that is recycled to the absorption step for hydrogen sulphide removal, and thereby tends to produce sulphur stoppages in the absorber packing that can seriously interfere with the absorber efficiency. Therefore the density of sulphur in the foam blanket must be carefully regulated to prevent sulphur settling back into the solution.

A primary object of the present invention is to provide an apparatus and process for regenerating a fouled absorbing solution with a gas and for separating a formed solid therefrom that gives improved solution regeneration and produces effluents to said apparatus of regenerated solution and separated solids, each containing a much smaller quantity of the other than was heretofore obtainable.

A further object of the invention is to provide improvements in an existing apparatus and process for regenerating a fouled purification solution with a gas and separating a formed solid therefrom to produce both a more efficient separation of solid from the regenerated solution and of solution from the solid.

The invention has for further objects such other improvements and such other operative advantages or results as may be found to obtain in the processes or apparatus hereinafter described and claimed.

In the accompanying drawings forming a part of this specification and showing for purposes of exemplification a preferred apparatus and method in which the invention may be embodied and practised without limiting the claimed invention specifically to such illustrative instance or instances:

The same characters of reference designate the same parts in each of the views of the drawings.

Figures 1, 2:
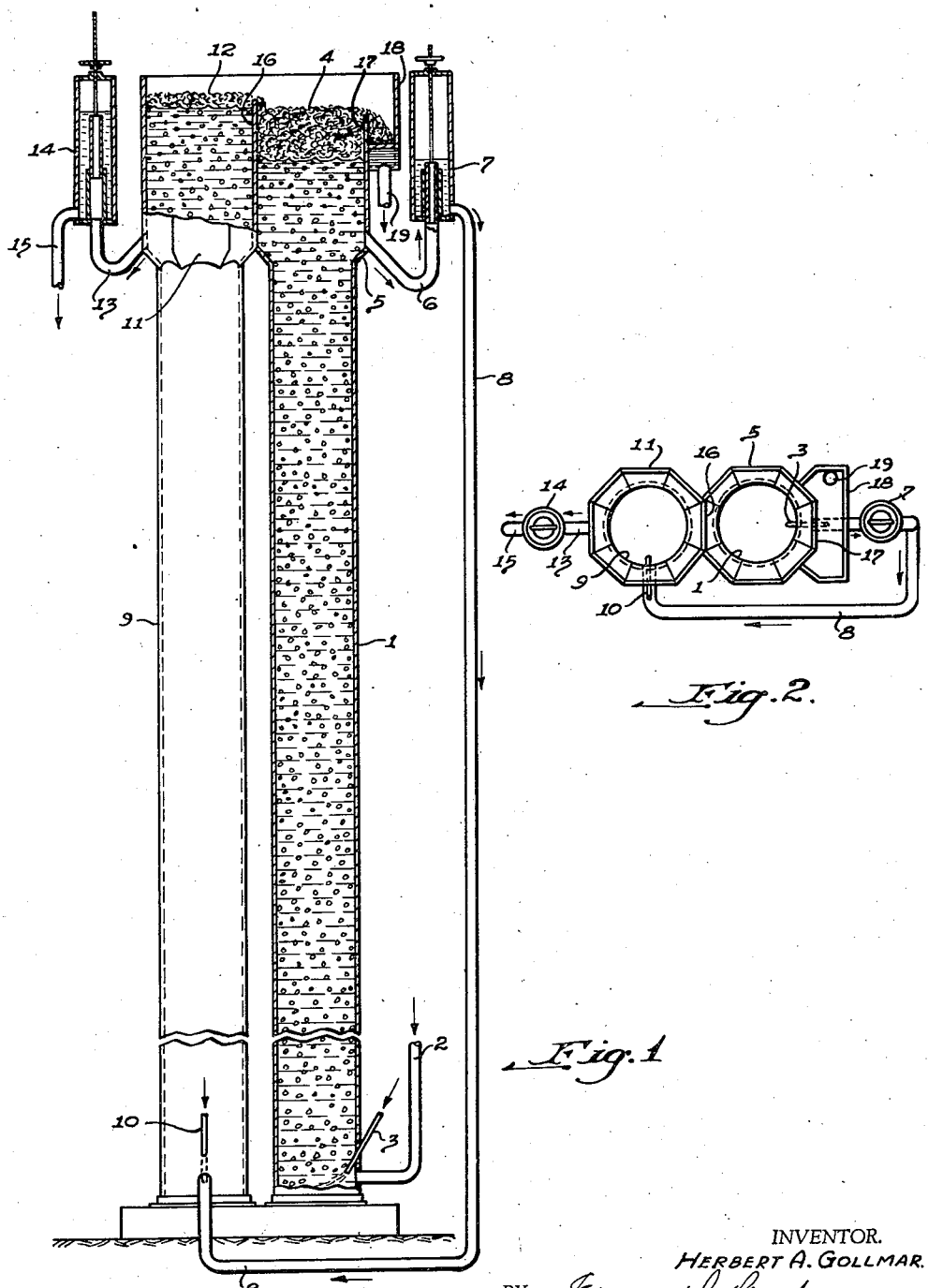
Figure 1 is a view in elevation, partly in vertical section, showing gas and liquid contact towers in combination with means for handling and removing produced elemental sulphur.
Figure 2 is a plan view of Figure 1.

Fouled absorption solution such as a fouled thioarsenate solution is pumped from a gas absorber for absorbing hydrogen sulphide into the lower part of a regenerating tower 1 through a pipe 2. Simultaneously, air at the required pressure head is forced through a line 3 that enters tower 1, adjacent and above the point of entry of line 2, the line 3 extending into tower 1 immediately above the pipe 2 to permit rapid and intimate mixing of air with incoming fouled solution. The fouled solution, carrying air finely distributed therethrough, flows upwards, continuously absorbing and utilizing oxygen in its transit. This oxygen replaces a part of the sulphur in the thioarsenate molecule, the sulphur being precipitated as elemental sulphur. After reacting with the oxygen, the thioarsenate molecule, now regenerated, has been changed to one of lower sulphur content and it can then be recycled for reuse to absorb more hydrogen sulphide.

Air in excess of that to be absorbed by the solution is used to float the precipitated sulphur to the surface of the solution, where it accumulates as a voluminous spume or foam blanket 4, in consequence of a large volume of entrained air. Tower 1 has a comparatively narrow diameter compared to its height, to permit protracted contact of solution and air. To disengage air from the foam blanket with minimum entrainment of solution and rupture of the sulphur, a relatively quiescent zone is provided at the upper extremity of tower 1 in a short header section 5 which has a greater cross-sectional area than tower 1, and is here shown as an octagonal section. The partially regenerated solution flows from header section 5 through line 6 to level regulator 7, a device that controls the solution level in the header section 5, and thence through line 8 into the lower part of tower 9, similar to tower 1. The solution is brought into contact with a new quantity of compressed air from line 10, and regeneration is completed in its rise through unobstructed tower 9 and a header section 11. The regenerated solution separated from its sulphur foam blanket 12, that is much thinner than blanket 4, flows from header 11 through outlet line 13, solution level regulator 14 and line 15 back for reuse in an absorber for removing hydrogen sulphide from gases.

It is known that solution up-flow in contact with air, followed by down-flow out of contact with air, permits utilization of absorbed oxygen so that in a following up-flow, again in contact with air, greater oxygen absorption is possible. Thus, in the present apparatus down-flow line 8 can be of any preferred diameter or length to permit a time lag for oxygen utilization between the solution up-flow series. Series flow of solution and series flow of sulphur foam in an opposite direction in more than two regenerators will enhance the hereinabove described advantages, the number of regenerators in the series being limited by other considerations, for example, capital outlay.

While the solution is regenerated in a succession of upwardly and downwardly flowing solution columns, here shown as flowing through a tower 1, section 5, line 8, tower 9 and section 11, the sulphur foam is caused to flow in an opposite direction from header section 11 to section 5 over a weir plate 16, that is common to these two sections. The height of weir 16 and the solution level in section 11 as controlled by regulator 14 is effective for separating solution in tower 9, yet permitting sulphur foam flow over weir 16. Thereafter the foam flows from section 5 over weir plate 17 to an inclined trough 18 from which it then flows through a line 19 to a filter. Confined by the walls of header sections 11 and 5, except for permitted flow over weir plates 16 and 17 of respectively lower heights, the level of regenerated solution in section 11 is controlled by level regulator 14 so as to maintain a high solution level therein and to provide a relatively thin foam blanket that is rapidly flowed, almost as quickly as it is produced, over weir 16 into section 5. This novel means and process reduce to a minimum the amount of sulphur that can sink from the foam blanket 12 to the regenerated solution, and that is recycled therewith to an absorber for reuse.

For example, a sample of regenerated solution from line 15 had a sulphur content of only .08 gram per litre of regenerated solution. In contrast, samples of regenerated solution taken from a regenerator built according to the prior art and operated normally to flow sulphur foam over the edges of a header section directly to an attached trough, had about .9 grams of sulphur per litre of regenerated solution, or more than ten times the sulphur content of the solution obtained with the present improvements.

In header section 5 the solution is carried at a much lower level than in section 11, which permits maintenance therein of a foam blanket of relatively great depth, so that the portion continuously flowing over plate 17 to trough 18 has a maximum sulphur and a minimum solution content. This operation reduces very materially the amount of solution to be handled by the sulphur filter means.

The novel process and means whereby solids on upflowing liquid columns are flowed in a direction opposite the liquid flow, with consequent efficient separation of liquid from solids and vice versa, can be variously adapted. In general, it is only necessary to confine the solids to flow over a weir means from one upflowing liquid column to another, the combined solids then being flowed over a second weir means to another upflowing liquid column in a series or to disposal means therefor where only two columns are used. The flow of the liquid columns in an opposite direction can be through separate connecting conduits for the columns where the weir means, as in the illustrated instance, completely separates the liquid columns.

Alternatively, a single liquid column can be divided near the top thereof usually into two columns by a weir, the liquid flowing under the weir over which flow the solids in an opposite direction. The relative heights of the liquid columns to permit solids flow as required can be obtained usually by liquid level regulators, although air levitation or even pumping means can be employed therefor. Some of the alternative arrangements are hereinafter described.

The described benefits can be realized in other and existing apparatus and process, for example, in unit apparatus comprising coaxially disposed conduits or pipes with partitions, wherein solution to be regenerated is maintained in a succession of upwardly and downwardly flowing solution columns. Where the sulphur foam blankets now overflow from the individual upward flow columns to a circumferentially attached trough, the foam blanket on the solution column adjacent the solution outlet line can be confined and caused to flow by solution level regulation over a weir, or the like, to another solution flow column and the total sulphur foam removed therefrom to a trough.

Likewise, the described benefits can be obtained to a marked degree in a single solution regenerating tower. In any regenerator, solution is lifted by the combined hydraulic pressure on the solution and the levitating action of the compressed air. Thus, the difference in levels of a quiescent solution and solution underoing regeneration by air is due to air levitation. By dividing the solution column near the top thereof, by means of a weir, or the like, into two unequal portions, it is possible to divert and vent a greater volume of the total air in that solution portion adjacent the outlet solution line and thereby, due to air levitation, to maintain a level in this solution portion that is appreciably higher than in the other solution portion. It is then possible rapidly to flow a relatively thin sulphur-foam blanket away from the solution outlet, that is, flow the sulphur foam from a higher solution level portion to one of lower level and subsequently remove therefrom the total sulphur produced, while maintaining therein a relatively thick sulphur foam blanket. While the sulphur foam flows over the weir as described, the regenerated solution flows in the opposite direction under the weir. The difference in solution column levels can be increased by employing other means, for example, by admitting additional air to the higher-level portion from an outside source, thus augmenting air levitation.

Particular emphasis has been placed on the utility of the present novel invention for the regeneration by air of solution flowing from an absorber for the removal of hydrogen sulphide from gases and liquids and for the continuous and efficient separation of sulphur from regenerated solution. However, the present invention can importantly improve any process wherein a liquid is regenerated by treatment with a gas, a solid also being present that can be segregated by flotation and where it is desirable to have more complete removal of solid from outlet liquid and vice versa.

The invention hereinabove set forth is embodied in particular form and manner but may be variously embodied within the scope of the claims hereinafter made.

I claim:

1. A process for regenerating for reuse a fouled thioarsenate solution flowing from an absorber for the removal of hydrogen sulphide from gases, comprising: maintaining the fouled thioarsenate solution in a continuously flowing stream through two columns of soution in series, introducing air at the foot of each column sufficient in amount and pressure to regenerate fouled thioarsenate solution and to promote flotation of liberated sulphur as a foam blanket thereabove, rapidly flowing the foam blanket with solution from the second to the top of the first column in the solution flow series to remove the sulphur from the regenerated thioarsenate solution flowing in the second column, returning regenerated solution to an absorber for reuse, maintaining a deep body of slowly settling foam above the first column to minimize the solution content in said sulphur foam as flowed from said column to disposal means therefor, and removing sulphur foam from the top of the deep body.

2. Apparatus for treating a liquid to separate solids therefrom comprising: a plurality of towers closed at their bottoms, connecting means between the towers for the flow of liquid in series from the bottom of the first tower to the top thereof and from the top of the first tower to the bottom of the following tower for upward and downward flow paths respectively, through the towers and connecting means, means to introduce liquid into the bottom of the first tower and to force the liquid upwardly to the top thereof under hydraulic pressure, means for introducing a gas into the bottom of each of said towers capable of precipitating solids from the liquid, an outlet for liquid from the upper portion of the final tower, means for maintaining different liquid levels in the towers in stepwise relation with the level of the first tower as the lowest level, means for collecting a foam containing solids separated from the liquid by the gas at the top of each tower, means for flowing said foam in stepwise manner from the final to the first tower, and means for separating from the first tower the accumulated foam containing solids.

3. Apparatus for regenerating a fouled fuel gas purification solution with air comprising: a plurality of towers closed at their bottoms, the upper portions of the towers having enlarged cross-sectional areas for collecting foam containing solid aggregates set free from the solution by air, connecting means between the towers for solution flow in series from the bottom of the first tower to the top thereof and from the top of the first tower to the bottom of the following tower for upward and downward liquid flow columns respectively in said towers and connecting means, means for continuously introducing a solution into the bottom of the first tower and for raising the liquid upwardly therein under hydraulic pressure to the top of the first tower, means for introducing air into the bottom of each of the towers to separate solids from the liquids in the towers and to form foam for carrying the separated solids to the tops of the towers, an outlet for regenerated solution from the upper portion of the final tower, means for maintaining different solution levels in the towers, the level of the first tower being the lowest, means for flowing in stepwise manner from the final to the first tower solids segregated from the solution by the air, and means for withdrawing from the first tower the accumulated solids that have been segregated.

4. In an apparatus for regenerating a fouled fuel gas purification solution with air comprising: a pair of vertical columns having enlarged areas at the tops thereof to provide settling chambers, means to introduce solution at the bottom of the first column and to cause liquid to flow upwardly at a slow rate through the column, means to withdraw solution from the top of the first column and introduce it into the bottom of the second column, means for introducing air into the bottoms of the columns in sufficient volume to precipitate sulphur from the solution and to produce a foam for floating sulphur to the tops of the columns, said solution being withdrawn from the top of the first column from the settling area in a manner to be substantially free of foam or air, overflow means for maintaining predetermined solution levels in the columns, a weir between the columns being arranged to maintain a comparatively shallow body of foam on the top of the second column, a weir at the top of the first column being arranged to maintain a comparatively deep body of foam on the first column, the overflow means for the second column being arranged to cause foam to flow from the second column into the top of the first column, the overflow means for the first column being arranged to cause settled foam having solids therein to overflow the weir out of the first column, and means to withdraw activated solution from the top of the second column.

5. A method of regenerating fouled thioarsenate purification solution comprising: continuously flowing upwardly thioarsenate solution as a vertical column of liquid, introducing into the bottom of the column air in sufficient volume and under sufficient pressure to precipitate sulphur therefrom and to form a foam to support and carry the sulphur to the top of the column, maintaining a body of foam at the top of the column to settle solution therefrom, withdrawing partially regenerated liquid from the top of the column and continuously passing it upwardly as a second column, adding air to the bottom of the second column to further oxidize the solution to separate solid sulphur therefrom and to provide a foam to float the sulphur to the top of the second column, removing foam from the second column into the foam body on the first column, separating sulphur foam from the top of the foam body of the first column and withdrawing activated thioarsenate solution from the top of the second column.

6. A method of regenerating fouled thioarsenate purification solution comprising: continuously flowing the thioarsenate solution as an upwardly moving vertical column of liquid, introducing into the bottom of the column air in sufficient volume to precipitate solid sulphur therefrom and to form a foam to support the sulphur and carry it to the top of the column, maintaining a comparatively deep body of foam at the top of the column to settle solution therefrom, withdrawing partially regenerated liquid from the top of the column and continuously passing it as an upwardly flowing second column, adding air to the bottom of the second column to further oxidize the solution to separate solids therefrom and to provide a foam to float sulphur to the top of the second column, maintaining a comparatively shallow body of foam at the top of the second column, removing foam from the second column into foam on the first column, separating a sulphur foam from the top of the first column and withdrawing activated thioarsenate solution from the top of the second column.

7. A method of regenerating fouled thioarsenate purification solution comprising: continuously flowing the thioarsenate solution as an upwardly moving vertical column of liquid, introducing into the bottom of the column air in sufficient volume to precipitate sulphur therefrom and to form a foam to support the sulphur and carry it to the top of the column, decreasing the rate of flow of liquid at the top of the column to provide a settling zone and collecting a comparatively deep bed of sulphur foam on the top of the zone, withdrawing partially regenerated liquid from the top of the column and continuously passing it upwardly as a second column, adding air to the bottom of the second column to further oxidize the liquid to separate sulphur and to provide foam to float the sulphur to the top of the second column, decreasing the rate of flow of liquid at the top of the second column to provide a foam collecting zone, removing foam from the second column into the foam body of the first column, separating sulphur in foam from the top of the first column and withdrawing actified solution from the top of the second column.

HERBERT A. GOLLMAR.

REFERENCES CITED

The following references are of record in the file of this patent:

UNITED STATES PATENTS

| Number | Name | Date |
|---|---|---|
| 2,125,190 | Denig et al. | July 26, 1938 |
| 2,350,943 | Thompson et al. | June 6, 1944 |